(12) United States Patent
Lovell et al.

(10) Patent No.: US 6,414,698 B1
(45) Date of Patent: Jul. 2, 2002

(54) METHOD FOR ENABLING ADAPTIVE SIZING OF DISPLAY ELEMENTS

(75) Inventors: Douglas C. Lovell, Fishkill, NY (US); Richard D. Thompson, Trumbull, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/290,164

(22) Filed: Apr. 13, 1999

(51) Int. Cl.[7] .................................................. G09G 5/26
(52) U.S. Cl. ........................ 345/800; 345/472; 345/815; 345/660
(58) Field of Search .................................. 345/127, 128, 345/129, 130, 132, 439, 472, 342, 788, 789, 790, 800, 809, 815, 472.1, 472.2, 660, 667–671, 715, 801

(56) References Cited

U.S. PATENT DOCUMENTS

| | | | | |
|---|---|---|---|---|
| 5,001,697 A | * | 3/1991 | Torres | 395/139 |
| 5,227,771 A | * | 7/1993 | Kerr et al. | 345/119 |
| 5,428,733 A | * | 6/1995 | Carr | 395/342 |
| 5,513,342 A | * | 4/1996 | Leong et al. | 395/340 |
| 5,542,039 A | * | 7/1996 | Brinson et al. | 395/161 |
| 5,751,283 A | * | 5/1998 | Smith | 345/342 |
| 5,754,873 A | * | 5/1998 | Nolan | 707/527 |
| 5,847,706 A | * | 12/1998 | Kingsley | 345/342 |
| 5,864,332 A | * | 1/1999 | Young | 345/127 |

* cited by examiner

Primary Examiner—Lun-Yi Lao
(74) Attorney, Agent, or Firm—Whitham, Curtis & Christofferson, P.C.; Stephen C. Kaufman

(57) ABSTRACT

Display elements are designed to answer element size queries by a layout manager which enable an enhanced layout manager to pack elements on the display with greater uniformity and density than is possible with the element size queries available in the state of the art. The layout manager automatically uses height-for-width and/or width-for-height trade-offs to optimally resize said elements according to the shape of the available area.

10 Claims, 8 Drawing Sheets

METHOD FOR ENABLING ADAPTIVE SIZING OF DISPLAY ELEMENTS

CROSS-REFERENCE TO RELATED APPLICATION

This application is related to a concurrently filed application Ser. No. 09/290,165, entitled "Method for Arranging Display Elements," filed by D. Lovell and R. Thompson and assigned to a common assignee, the subject matter of which is incorporated herein by reference.

BACKGROUND OF THE INVENTION

1. Field of the Invention

The present invention generally relates to the design of adaptive computer display layout managers and, more particularly, to a method for designing and utilizing display elements that allows a layout manager to arrange and pack display elements to improve screen appearance, especially when displaying the components on a screen of unknown size.

2. Background Description

The invention is an innovation in the design of "layout managers." Layout managers are computing tools for arranging "elements" in a computer display. Elements are pictures, buttons, blocks of text, or other graphics which may be passive or active. Passive elements are for viewing only. Active elements may cause a change in appearance or behavior when stimulated by the action of a person viewing the display. These are the fundamental, abstract components of every display-based human-computer interface.

Layout managers function by finding the size of the elements of the display and positioning them according to a predetermined method. Some layout managers align their elements in a row or a column. Others assign elements to a predetermined areas, such as the top, bottom, left, right, or center.

When a layout manager arranges elements, it often creates areas not occupied by any element. This is especially true if the elements are not uniform in size. Layout managers will typically enlarge elements in one dimension to fill the unused areas. A layout manager which places a narrow element above a wide element might make the narrow element wider to keep the elements uniform in width. That action may leave the narrow element with more height than it requires.

To illustrate the problem, consider the following. We have a title element whose content is "AutoLoan Exchange." The element preferably stacks the words "AutoLoan" above the word "Exchange." It is eight characters wide and two lines high. A layout manager assigns a wider, thirty-character width. Now, the entire title fits on one line, but the element height remains at two lines.

Poor packing of display elements gives a poor aesthetic impression, wastes space available on the screen, and impairs understanding of the interface. Accordingly, authors invest a large amount of time hand crafting the layout of each screen in an application, at high cost per screen.

SUMMARY OF THE INVENTION

It is therefore an object of the invention to provide a layout manager to automatically adapt to changes in the size of the display and achieve an aesthetically pleasing appearance.

According to the invention, elements which are specially designed to answer element size queries enable an enhanced layout manager to pack elements on the display with greater uniformity and density than is possible with the element size queries available in the state of the art. The invention uses height-for-width and/or width-for-height trade-offs to allow the optimal resizing of said elements.

A layout manager determines the size of elements to be displayed by querying the elements. Prior art has established three queries by which a layout manager determines the size of each element. These are the element minimum, maximum, and preferred size in height and width. We add two additional preferred size queries: "preferred height given width" and "preferred width given height."

A layout manager may now adjust the width of an element and, at the same time, revise its height. A layout manager may also adjust the height of an element, and, at the same time, revise its width. A layout manager which takes advantage of this capability is described in concurrently filed, copending application Ser. No. 09/290,165.

The queries in the state of the art do not relate preferred width to preferred height. This means that elements cannot adjust their size preferences based on a width or a height afforded them. An element which contains flowed text, for example, may become shorter when made wider.

When identified, the problem may be solved by manually overriding the preferred size answer of the element or by substituting another element with different behavior. The present invention enables the layout manager to automatically adapt without manual intervention. The adaption helps eliminate the need to tailor layouts according to their content. It enables a single application to work well with a variety of display sizes.

It is another object of the invention for the newly designed elements to function with layout managers that use only the queries existing in the prior art, i.e., maximum, minimum and preferred size queries, thus being backwardly compatible.

The invention is useful where a layout must adapt to the display of many different devices. Personal Information Devices (PIDs), for example, have displays which vary greatly in size and in aspect ratio. A designer creating an application for PIDs has no opportunity to hand-craft the screens for each display. Only an automatic method, as provided by the invention, will solve the problems which occur as the size of the target display area changes.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
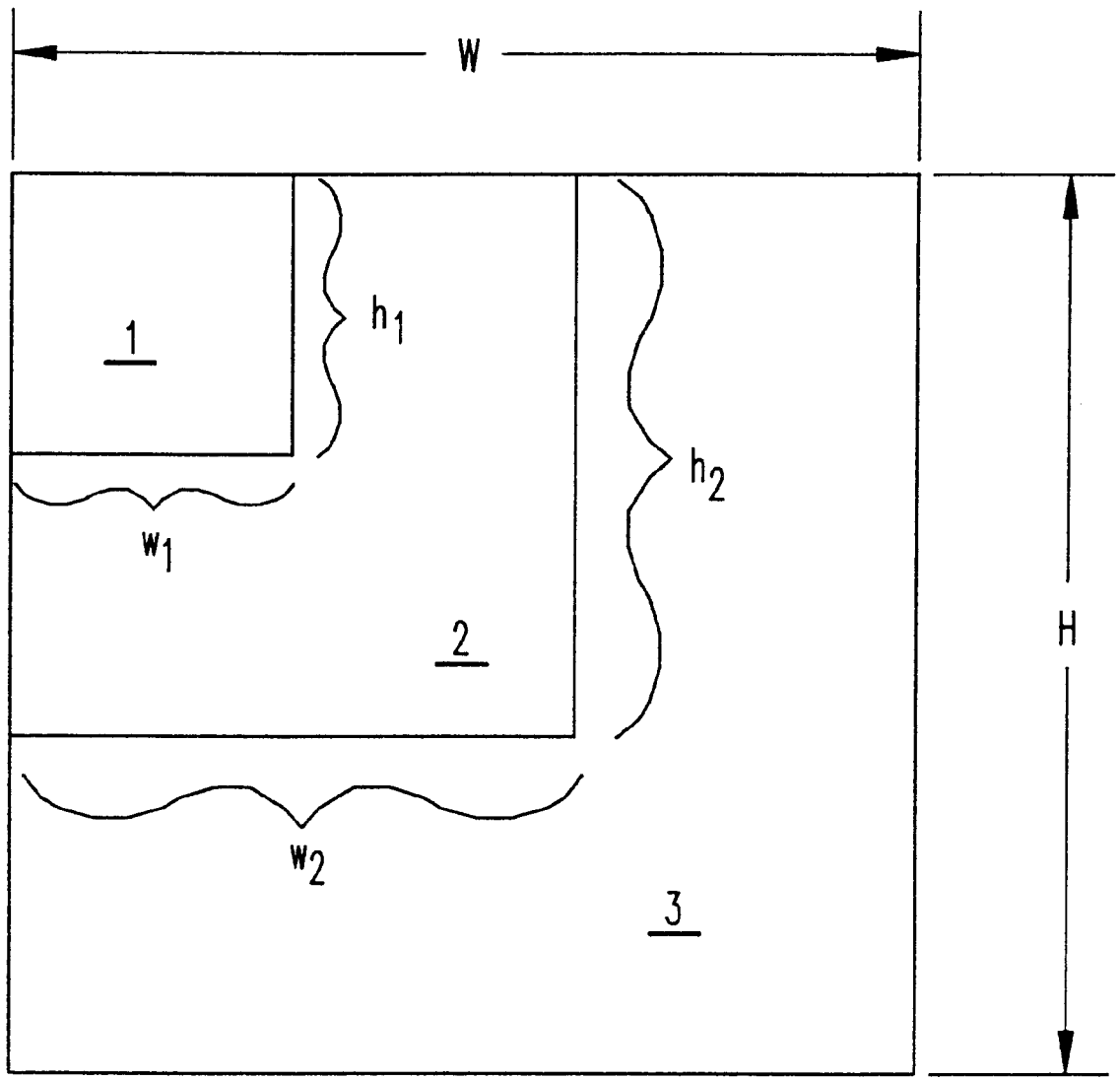
FIG. 1 is a diagram representing the element size queries available in the state of the art.

Referring now to the drawings, and more particularly to FIG. 1, there is shown a diagram of the size queries typically answered by elements in the state of the art. An element will typically answer for its minimum dimensions represented in box 1 as $h_1$ by $w_1$, its preferred dimensions represented by box 2 as $h_2$ by $w_2$, and its maximum dimensions represented by box 3 as H by W. The element reports these dimensions in the form of height h and width w, giving a range of vertical sizing dimension $h_1$ to H, and a range of horizontal sizing dimension $w_1$ to W.

Figure 2:
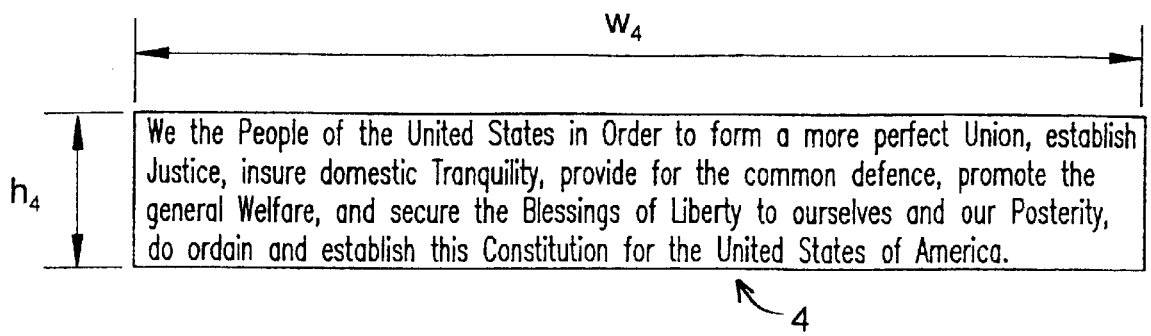
FIG. 2 is an illustration showing an example of the preferred size of a wide or short element containing text.
Figure 3:
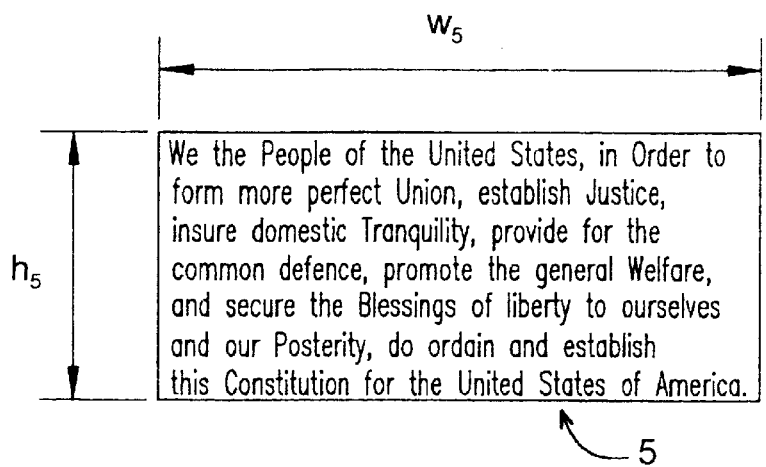
FIG. 3 is an illustration showing the preferred size of a narrower or taller element containing the same text as in FIG. 2.

FIGS. 2 and 3 illustrate that for many elements the preferred width and height are not independent. FIG. 2 shows the preferred size of a wide or short element 4. Note that the display element 4 constitutes the box surrounding the text and not just the textual characters themselves. In other words, when the layout manager makes room for the display element on a given display, it must accommodate the size of the box 4. This element prefers to have a width $w_4$ for a given height $h_4$, or alternatively, a height $h_4$ for a given width $w_4$. FIG. 3 shows the preferred size of a narrower or taller element 5. This element now prefers a width $w_5$ for a given new height $h_5$, or alternatively, a height $h_5$ for a given width $w_5$.

Elements which hold flowed text are not the only types of elements for which preferred width and height are related. Elements which contain a large number of child elements, such as a frame around a number of buttons, and elements that contain images which may be scaled without distortion also have this property.

Figure 4:
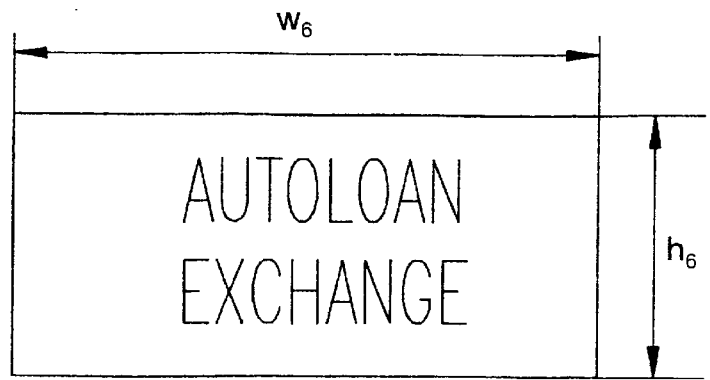
FIG. 4 is an illustration showing the preferred size of an example element.
Figure 5:
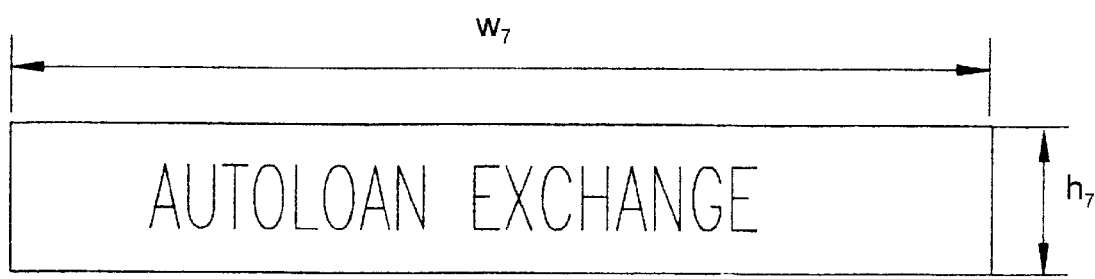
FIG. 5 is an illustration showing an example of the element in FIG. 4 in a poorly arranged, resized window display.
Figure 6:
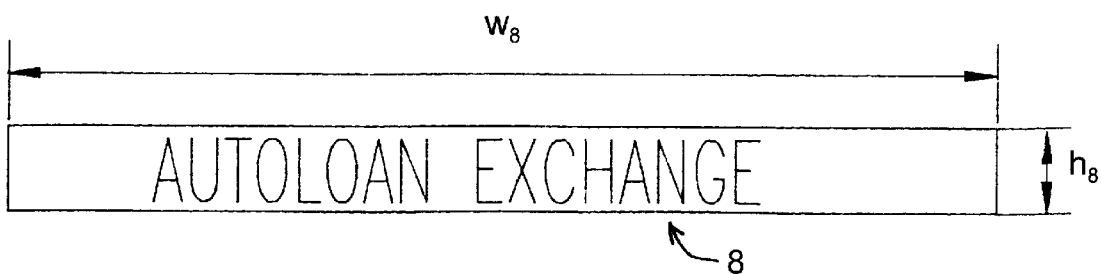
FIG. 6 is an illustration showing an example of a visually pleasing resized window display created by the method of the present invention given preferred width.

FIGS. 4 and 5 demonstrate the error which layout managers must introduce into their layouts given the size queries available in the state of the art, and FIG. 6 illustrates the correct layout enabled by this invention. FIG. 4 shows an element 6 containing the stacked text, "AUTOLOAN EXCHANGE" and its preferred size answer given as width $w_6$ and height $h_6$. In FIG. 5, the layout manager has given the element 7 width $w_7$ available on the display, in excess of its preferred width. However, the layout manager has given the element 7 its preferred height $h_7$. The element 7 now uses the extra width to write its contents on one line, leaving unused space above and below. In FIG. 6, the element 8 provided a better height $h_8$, given the available width $w_8$. In this example, the width of the elements 7 and 8 remains the same (i.e., $w_7$ equals $w_8$).

Figure 7:
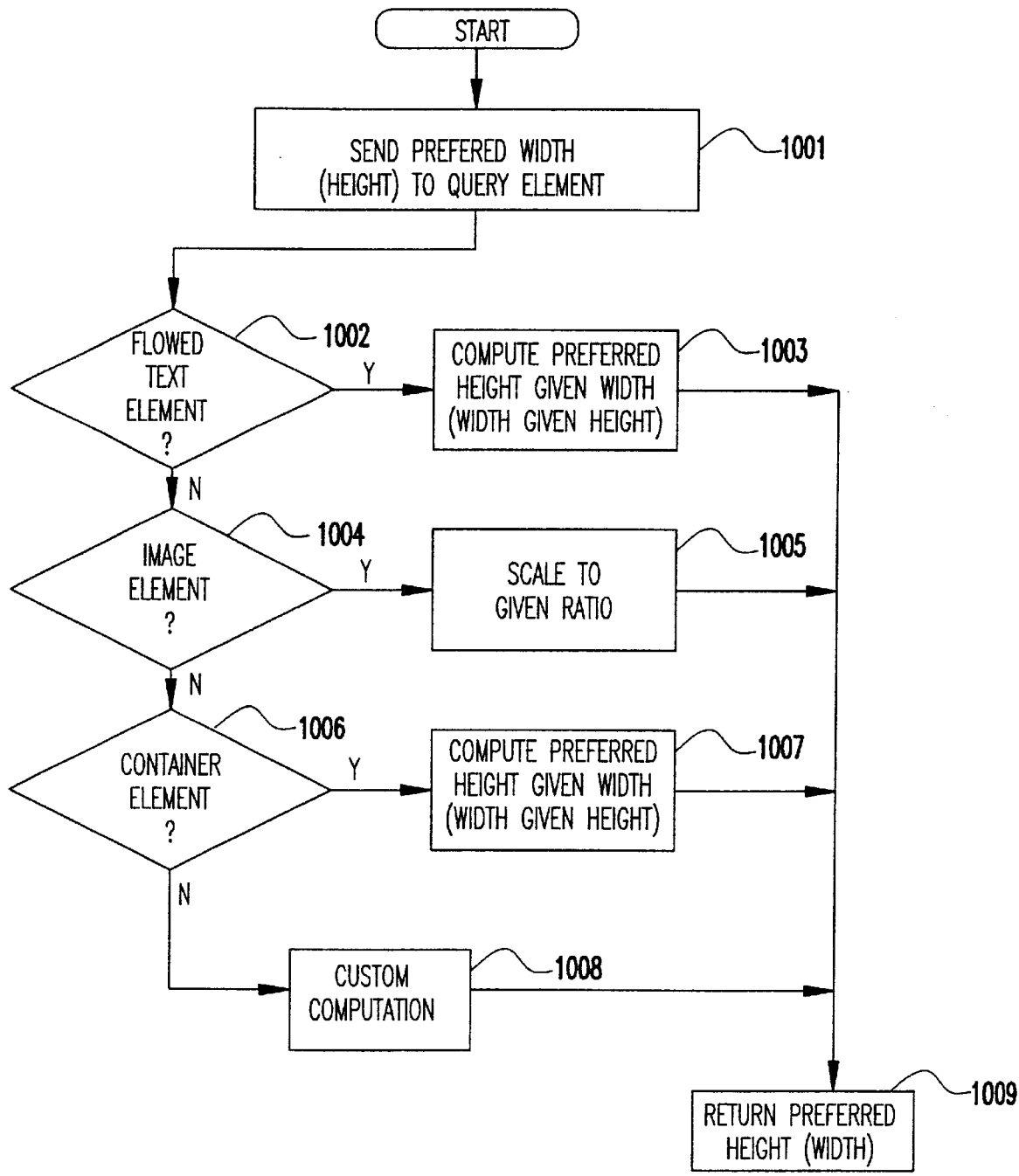
FIG. 7 is a flow diagram representing the method of querying the display elements and computations for preferred height given width or width given height according to the present invention.

FIG. 7 shows the general method used to query the element for preferred width given height (or preferred height given width). The layout manager queries the element in function block 1001 by sending the given width (height). The actual display element is an instantiation of the element class, with this query as a function, or method. The actual computational method used depends on the actual display element type, or sub-class. The flow diagram is illustrated with nested decision blocks, but this decision is actually unnecessary due to the nature of the object oriented design.

If the element is a flowed text element as determined in decision block 1002, the preferred height (width) is calculated in function block 1003. This computation is shown in FIGS. 8 and 9.

Figure 8:
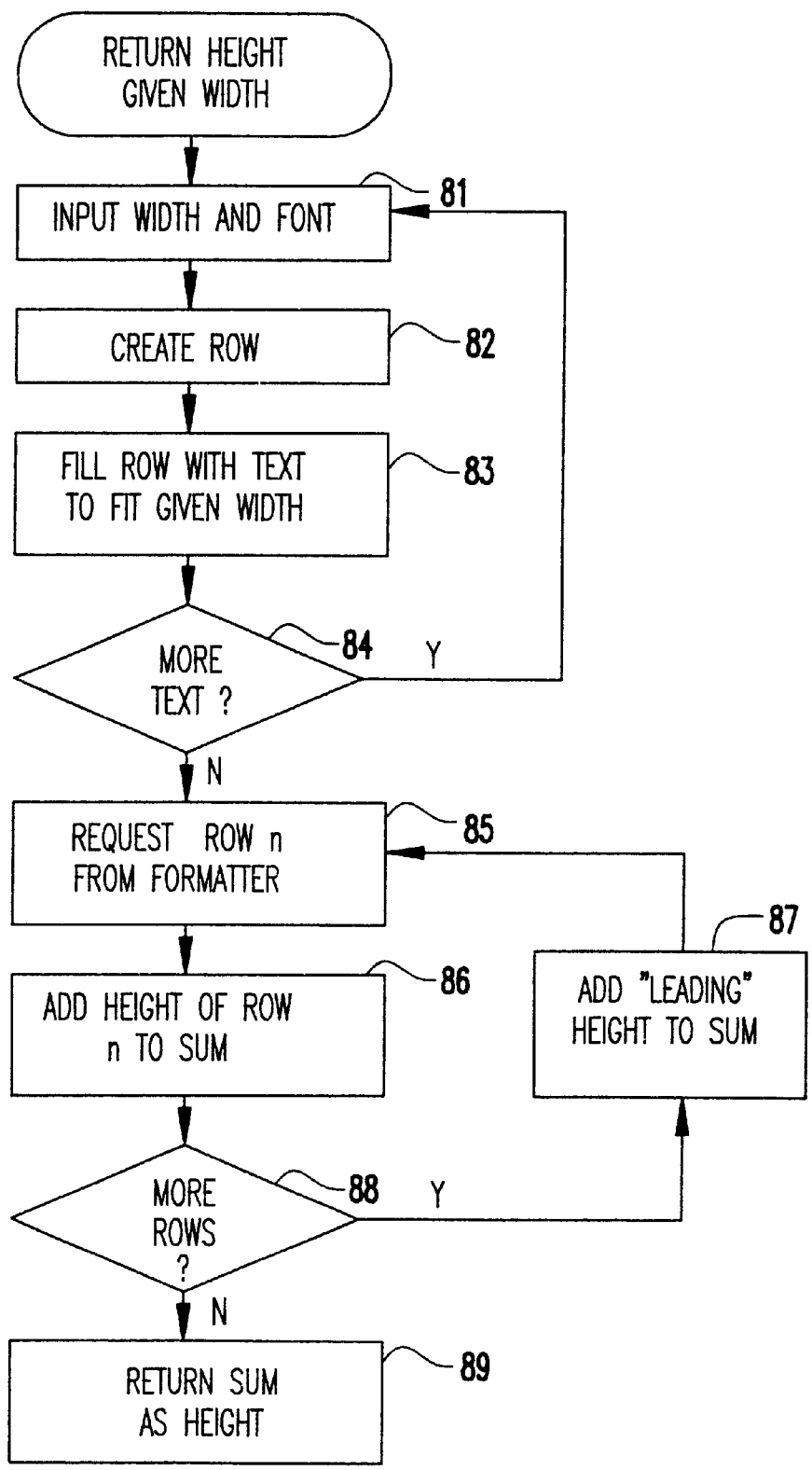
FIG. 8 is a flow diagram representing the method of determining preferred height given width for a text element according to the present invention.

Referring first to FIG. 8, the text element calculated height given width by making use of a formatter which calculates the amount of text which will fit on a line of a given width with the given font. The given width and font are input to the formatter in function block 81. The formatter creates a row in function block 82 and then fills the row with text to fit the given width in function block 83. Each row of text has width and height properties. A test is made to determine if there is more text in decision block 84. The formatter yields rows of text in function blocks 82 and 83 until it has exhausted all of the text as determined in decision block 84. The text element requests each row from the formatter in function block 85. The height of the last requested row is added to the Sum in function block 86. The space to be added between rows (i.e., "leading") is added to the Sum in function block 87 after it has been determined that there will be a next row, in decision block 88. If there are additional rows, as determined in decision block 88, the process loops back, adding the leading in function block 87 and then to function block 85 to request the next row. Once all of the rows have been summed, as determined in decision block 88, the resulting sum is reported as the requested height given width in function block 89. Note that the art of typesetting commonly refers to the space between rows as "leading".

Figure 9:
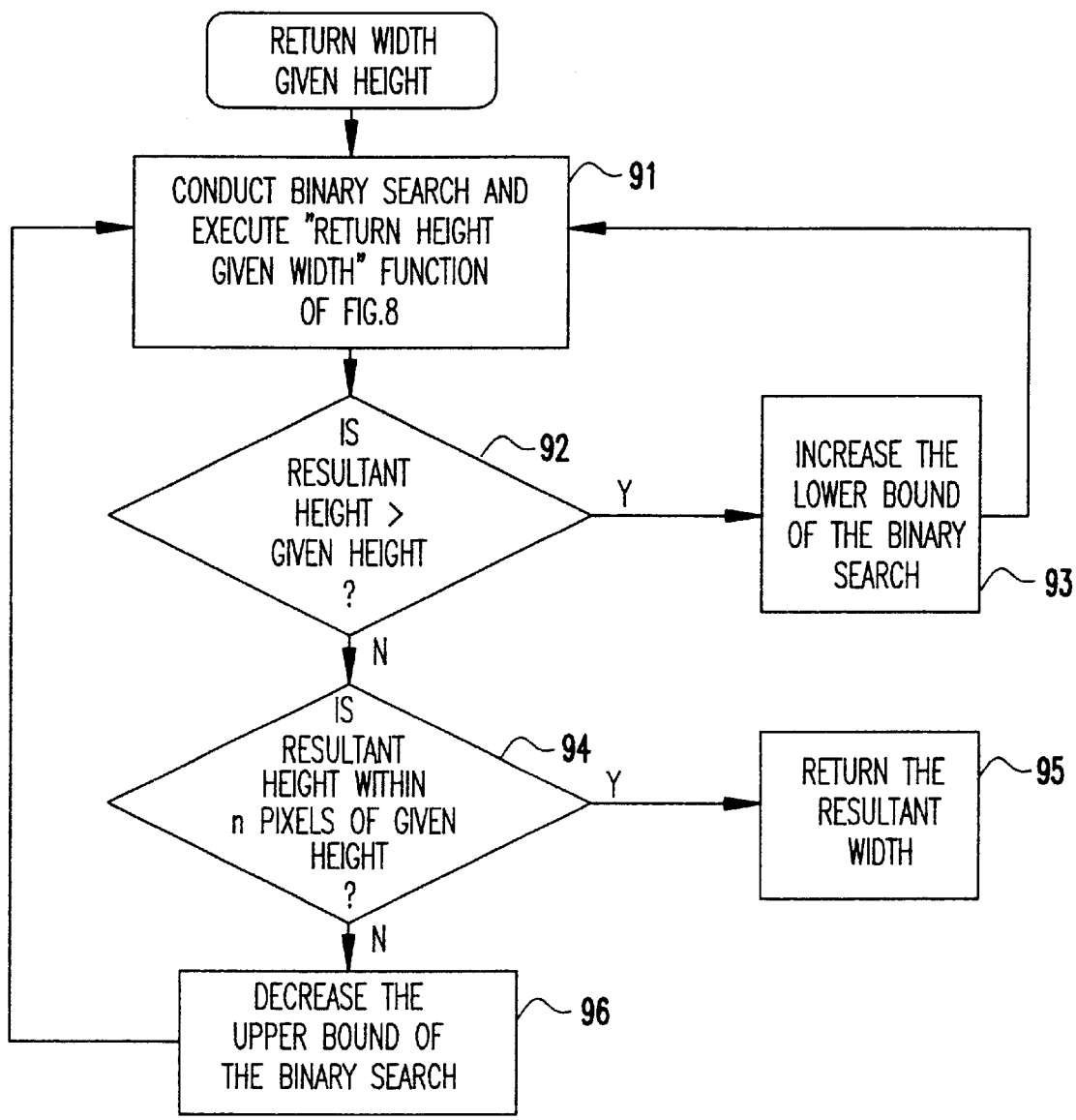
FIG. 9 is a flow diagram representing the method of determining preferred width given height for a text element according to the present invention.

The text element uses the height given width calculation just described to determine width given height as shown in FIG. 9. A binary search is executed through the range of widths from the element minimum width to the element maximum width in function block 91. At each trial of the binary search it executes the height given width algorithm, as shown in FIG. 8, and described above. If the resultant height is greater than the given height, as determined in decision block 92, it increases the lower bound of the binary search in function block 93 and then continues with the binary search in function block 91. When the resultant height is within some desired number of pixels of the given height, as determined in decision block 94, but not more than the given height, the binary search is aborted and the current trial width is returned in function block 95. If the resultant height is less than or equal to the given height, it decreases the upper bound of the binary search in function block 96 and the next trial of binary search is executed in function block 91. If the binary search terminates, it returns the terminal width of the search. One should note that the number of pixels at which the search may be aborted, as determined in decision block 94, is an option which may be set by the caller, or layout manger. In the present invention, this parameter is set to approximately half the height of a row, not counting the "leading".

Referring again to FIG. 7, if the element is of image type as determined in decision block 1004, it typically has a stored ratio of width to height and/or ratio of height to width that is used to calculate the preferred height given width (width given height) in function block 1005.

Another type of element implemented in the present invention is a "container" element. A container element is simply an element which includes other elements. A container element usually makes use of a layout manager to arrange the contained elements and determine its size requests. The layout manager as described in the concurrently filed, copending application Ser. No. 09/290,165 implements an enhanced method for arranging container elements. Referring again to FIG. 7, if the element is of the container type, as determined by decision block 1006, the preferred height given width (width given height) is calculated in function block 1007 which is shown in detail in FIGS. 10 and 11.

Figure 10:
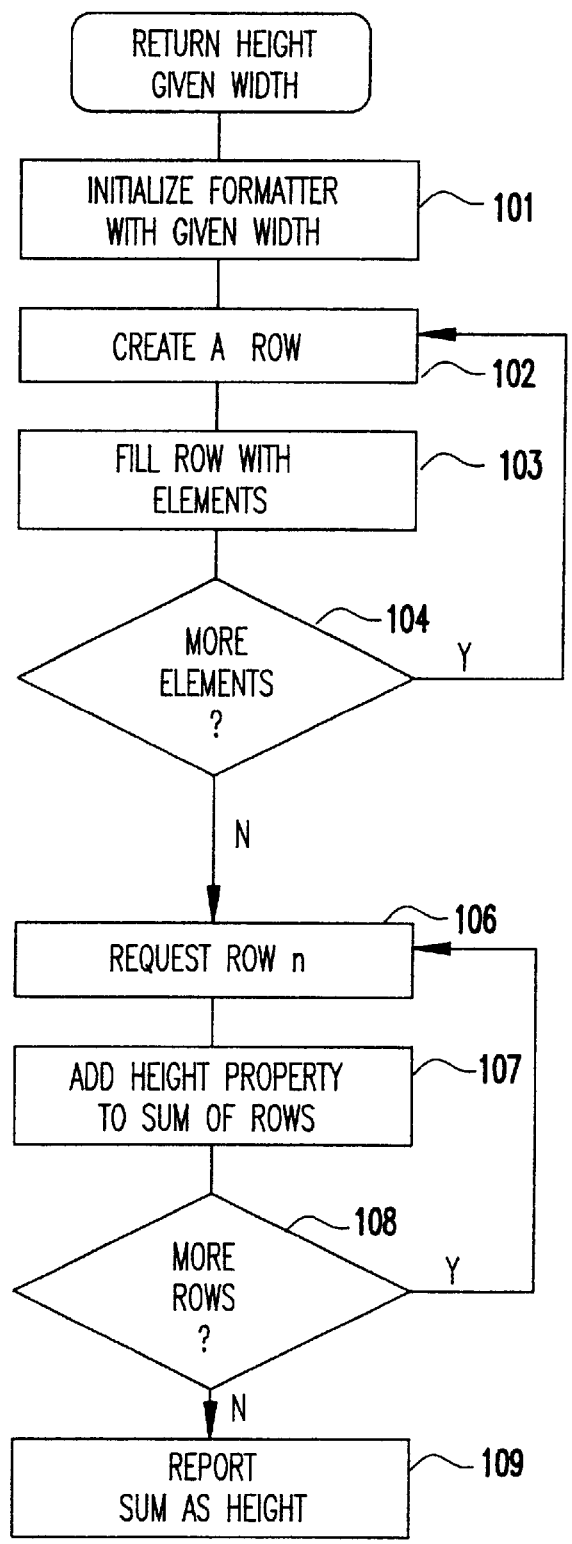
FIG. 10 is a flow diagram representing the method of determining preferred height given width for a container element according to the present invention.

Referring first to FIG. 10, the container element calculates height given width by making use of a formatter which calculates the number of elements which will fit on a line of a given width. The formatter is initialized with the given width in function block 101. The formatter yields rows of elements until it has exhausted all of the elements. A new row is created in function block 102 and then filled with elements in function block 103. If more elements remain, as determined in decision block 104, the process returns to function block 102 and continues until no more elements remain. Each row of elements has width and height properties, and a property which gives the width needed to add the next element to the row. We refer to this last property as the "additional width" property. The additional width property of the last row is undefined. The calculations which follow disregard it. The container element requests each row from the formatter in function block 106. The height of the last requested row is added to the Sum in function block 107. If there are additional rows, as determined in decision block 108, the process loops back to function block 106 to request the next row. Once all of the rows have been summed, as determined in decision block 108, this resulting sum is reported as the requested height given width in function block 109.

Figure 11:
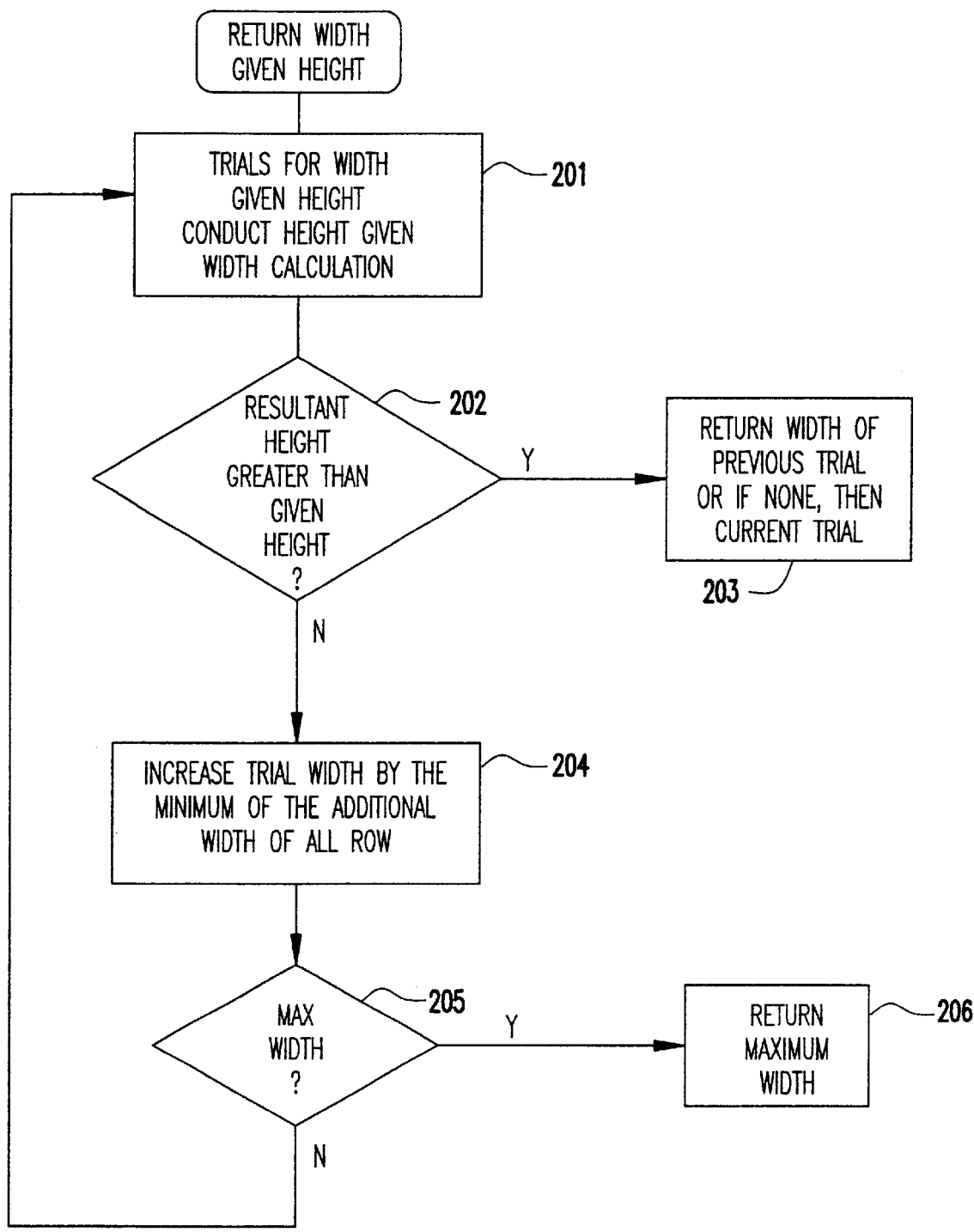
FIG. 11 is a flow diagram representing the method of determining preferred width given height for a container element according to the present invention.

The container element uses the height given width calculation, as shown in FIG. 10, and as described above, to determine width given height. Referring now to FIG. 11, the container element makes trials beginning with the minimum width of the element and ending at or before the maximum width of the element. At each trial it executes the height given width algorithm, as shown in FIG. 10 and described above, in function block 201. If the resultant height is greater than the given height, as determined in decision block 202, it returns the width tried in the previous trial, or if there was no previous trial, the current trial width is returned in function block 203. If the resultant height is less than or equal to the given height it increases the trial width by the minimum of the additional width properties of all the rows in function block 204. If the trials have attained the maximum width then the element returns the maximum width as the preferred width given height in function block 206.

Other types of elements will have their own methods for preferred height given width (width given height) as computed in function block 1008, as shown in FIG. 7. For instance, an element type might be implemented that requires table look-up, optionally interpolating between values in the table. One skilled in the art can easily create the appropriate computational methods for any element contemplated, and implement these computations in sub-class functions (methods) for any element permitting such sub-classes.

The method for determining values for the queries is implemented as a function, or method, in a layout manager class. One or more instances of this class are created and a specific layout manager object is referenced by each display element object. This reference, or registration, may be dynamically altered at run time by changing the reference to another supporting class which does the calculation. Moreover, the method for arranging elements performed by a layout manager may be row-ordered or column-ordered; rows could be stacked top to bottom or bottom to top; and columns could be stacked left to right or right to left.

Regardless of the element type, the preferred height given width (width given height) is returned to the querying function of the layout manager in function block 1009, as shown in FIG. 7.

In the state of the art, elements have methods which respond to requests for minimum, maximum and preferred size. These methods form an interface. All of the element s described here implement that interface, in addition to the interface for adaptive size requests newly disclosed here. They are therefore useful in the state of the art layout managers as well as in the improved art described in the concurrently filed, copending application Ser. No. 09/290, 165

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of making adaptive size adjustments for automatically sizing and arranging elements on a display, comprising the steps of:

receiving from a layout manager a given first dimension available for displaying an element on a display, wherein said given first dimension is a height and said preferred second dimension is a width;

providing a display element for determining a preferred second dimension perpendicular to said first dimension, wherein said providing step includes the following steps for determining said preferred width of said display element of type text element:

(a) conducting a search through a range of trial widths from an element minimum width to an element maximum width by first determining a preferred height for a given width, (b) increasing the lower bound of said search if a resultant height is greater than said given height, (c) returning a resultant width as said preferred width if the resultant height is within a desired number of pixels of said given height, and (d) decreasing the upper bound of said search and returning to step (a) if the resultant height is less than or equal to said given height; and accepting by said display element size queries, said size queries including said preferred second dimension, wherein said first given dimension remains constant and said preferred second dimension is computed according to a type of said display element so as to adapt said display element to a type of display, wherein said type of display element is a text element.

2. A method of making adaptive size adjustments for automatically sizing and arranging elements on a display, comprising the steps of:

receiving from a layout manager a given first dimension available for displaying an element on a display, wherein said given first dimension is a height and said preferred second dimension perpendicular to said first dimension is a width;

providing a display element for determining a preferred second dimension perpendicular to said first dimension, wherein said type of display element provided in said providing step is an image element, and wherein said providing step includes the following steps for determining said preferred width:

inputting said given height, determining a preferred width by multiplying said given height by a stored ratio of width/height, and returning said preferred width for said given height; and accepting by said display element size queries, said size queries including said preferred second dimension, wherein said first given dimension remains constant and said preferred second dimension is computed according to a type of said display element so as to adapt said display element to a type of display.

3. A method of making adaptive size adjustments for automatically sizing and arranging elements on a display, comprising the steps of:

receiving from a layout manager a given first dimension available for displaying an element on a display, wherein said given first dimension is a width and said preferred second dimension is a height;

providing a display element for determining a preferred second dimension perpendicular to said first dimension, wherein said type of display element provided in said providing step is an image element, and wherein said providing step includes the following steps for determining said preferred height:

inputting said given width, determining a preferred height by multiplying said given width by a stored ratio of height/width, and returning said preferred height for said given height; and accepting by said display element size queries, said size queries including said preferred second dimension, wherein said first given dimension remains constant and said preferred second dimension is computed according to a type of said display element so as to adapt said display element to a type of display.

4. A method of making adaptive size adjustments for automatically sizing and arranging elements on a display, comprising the steps of:

receiving from a layout manager a given first dimension available for displaying an element on a display, wherein said given first dimension is a height and said preferred second dimension is a width;

providing a display element for determining a preferred second dimension perpendicular to said first dimension, wherein said type of display element provided in said providing step is a container element, and wherein said providing step includes the following steps for determining said preferred width of said display element of type container element:

(a) conducting trials through a range of trial widths from an element minimum width to an element maximum width by first determining a preferred height for a given width of a row, (b) if a resultant height is greater than said given height then (1) if a previous trial was completed, then returning said trial width of the previous trial, (2) otherwise, if a previous trial was not completed, then returning said trial width of the current trial, (c) increasing the trial width by a minimum of additional width properties of all said rows, (d) if the trial width is less than the element maximum width, then repeating steps (a) to (c), otherwise if the trial width is not less than the element maximum width, then returning as said preferred width the element maximum width; and accepting by said display element size queries, said size queries including said preferred second dimension, wherein said first given dimension remains constant and said preferred second dimension is computed according to a type of said display element so as to adapt said display element to a type of display.

5. A method of making adaptive size adjustments for automatically sizing and arranging elements on a display, comprising the steps of:

receiving from a layout manager a given first dimension available for displaying an element on a display, wherein said given first dimension is a height and said preferred second dimension is a width;

providing a display element for determining a preferred second dimension perpendicular to said first dimension, wherein said type of display element provided in said providing step is a container element, and wherein said providing step includes the following steps for determining said preferred height of said display element of type container element:

(a) conducting trials through a range of trial heights from an element minimum height to an element maximum height by first determining a preferred width for a given height of a row, (b) if a resultant width is greater than said given width then (1) if a previous trial was completed, then returning said trial height of the previous trial, (2) otherwise, if a previous trial was not completed, then returning said trial height of the current trial, (c) increasing the trial height by a minimum of additional height properties of all said columns, (d) if the trial height is less than the element maximum height, then repeating steps (a) to (c), otherwise if the trial height is not less than the element maximum height, then returning as said preferred height the element maximum height; and accepting by said display element size queries, said size queries including said preferred second dimension, wherein said first given dimension remains constant and said preferred second dimension is computed according to a type of said display element so as to adapt said display element to a type of display.

6. A method of making adaptive size adjustments for automatically sizing and arranging elements on a display, comprising the steps of:

receiving from a layout manager a given first dimension available for displaying an element on a display;

providing a display element for determining a preferred second dimension perpendicular to said first dimension, wherein said type of display element provided in said providing step determines a means for determining a preferred second dimension perpendicular to said first dimension, and wherein a first custom computation is used to determine a preferred width given a height and a second custom computation is used to determine a preferred height given a width; and accepting by said display element size queries, said size queries including said preferred second dimension, wherein said first given dimension remains constant and said preferred second dimension is computed according to a type of said display element so as to adapt said display element to a type of display.

7. A method of making adaptive size adjustments for automatically sizing and arranging elements on a display, comprising the steps of:

receiving from a layout manager a given first dimension available for displaying an element on a display, wherein said given first dimension is a height and said preferred second dimension a width and wherein said width is calculated using a table, wherein said table does not have a desired entry and said return of size queries is calculated by interpolating entries in said table;

providing a display element for determining a preferred second dimension perpendicular to said first dimension; and accepting by said display element size queries, said size queries including said preferred second dimension, wherein said given first dimension remains constant and said preferred second dimension is computed according to a type of said display element so as to adapt said display element to a type of display.

8. A method of making adaptive size adjustments for automatically sizing and arranging elements on a display, comprising the steps of:

receiving from a layout manager a given first dimension available for displaying an element on a display, wherein said given first dimension is a width and said preferred second dimension a height and wherein said height is calculated using a table, wherein said table does not have a desired entry and said return of size queries is calculated by interpolating entries in said table;

providing a display element for determining a preferred second dimension perpendicular to said first dimension; and accepting by said display element size queries, said size queries including said preferred second dimension, wherein said given first dimension remains constant and said preferred second dimension is computed according to a type of said display element so as to adapt said display element to a type of display.

9. A machine readable medium containing code for making adaptive size adjustments for automatically sizing and arranging elements on a display, the code implementing the steps of:

receiving from a layout manager a given first dimension available for displaying an element on a display;

providing a display element for determining a preferred second dimension perpendicular to said first dimension; and accepting by the display element size queries, said size queries including said preferred second dimension, wherein said given first dimension remains constant and said preferred second dimension is computed according to a type of said display element so as to adapt said display element to a type of display, wherein said type of display element provided in said providing step of the computer code determines a means for determining a preferred second dimension perpendicular to said first dimension, wherein a first custom computation is used to determine a preferred width given a height and a second custom computation is used to determine a preferred height given a width.

10. A machine readable medium containing code for making adaptive size adjustments for automatically sizing and arranging elements on a display, the code implementing the steps of:

receiving from a layout manager a given first dimension available for displaying an element on a display;

providing a display element for determining a preferred second dimension perpendicular to said first dimension; and accepting by the display element size queries that are calculated using a table, said size queries including said preferred second dimension, wherein said given first dimension remains constant and said preferred second dimension is computed according to a type of said display element so as to adapt said display element to a type of display, and wherein said table does not have a desired entry and said size queries are calculated by interpolating entries in said table.

* * * * *